US010056600B2

(12) United States Patent
Lee et al.

(10) Patent No.: US 10,056,600 B2
(45) Date of Patent: Aug. 21, 2018

(54) BATTERY PACK

(71) Applicant: LG Chem, Ltd., Seoul (KR)

(72) Inventors: Chul Kyu Lee, Daejeon (KR); Hyung Ku Yun, Daejeon (KR); Bum Young Jung, Daejeon (KR); Seung Ryul Choi, Daejeon (KR); Sun Mo An, Daejeon (KR)

(73) Assignee: LG Chem, Ltd. (KR)

(*) Notice: Subject to any disclaimer, the term of this patent is extended or adjusted under 35 U.S.C. 154(b) by 0 days.

(21) Appl. No.: 15/035,426

(22) PCT Filed: Jan. 5, 2016

(86) PCT No.: PCT/KR2016/000059
§ 371 (c)(1),
(2) Date: May 9, 2016

(87) PCT Pub. No.: WO2016/122129
PCT Pub. Date: Aug. 4, 2016

(65) Prior Publication Data
US 2016/0344013 A1 Nov. 24, 2016

(30) Foreign Application Priority Data

Jan. 30, 2015 (KR) .................. 10-2015-0015026

(51) Int. Cl.
*H01M 2/34* (2006.01)
*H01M 2/20* (2006.01)
*H01M 2/10* (2006.01)

(52) U.S. Cl.
CPC .......... *H01M 2/347* (2013.01); *H01M 2/202* (2013.01); *H01M 2/348* (2013.01); *H01M 2/10* (2013.01); *H01M 2200/103* (2013.01)

(58) Field of Classification Search
None
See application file for complete search history.

(56) References Cited

U.S. PATENT DOCUMENTS

2011/0039147 A1  2/2011  Cheon et al.
2012/0114981 A1  5/2012  Cho et al.
(Continued)

FOREIGN PATENT DOCUMENTS

CN    101025436 A    8/2007
CN    201266835 Y    7/2009
(Continued)

OTHER PUBLICATIONS

International Search Report from PCT/KR2016/000059, dated Apr. 15, 2016.
(Continued)

*Primary Examiner* — Carmen V Lyles-Irving
(74) *Attorney, Agent, or Firm* — Lerner, David, Littenberg, Krumholz & Mentlik, LLP

(57) ABSTRACT

Provided is a battery pack. The battery pack includes a battery module including first and second battery cells that are disposed adjacent to each other, wherein first and second electrode terminals are disposed on each of the first and second electrode terminals, a fuse part including a first fuse connecting the second electrode terminal of the first battery cell to the first electrode terminal of the second battery cell, and a switching device including a first switch disposed outside a top surface of the first battery cell of the battery module and connected to the first fuse and a second switch disposed below the first switch and connected to the second electrode terminal of the second battery cell.

7 Claims, 8 Drawing Sheets

(56) References Cited

U.S. PATENT DOCUMENTS

| | | |
|---|---|---|
| 2013/0149570 A1 | 6/2013 | Han et al. |
| 2014/0127549 A1 | 5/2014 | Roh et al. |
| 2014/0248523 A1 | 9/2014 | Roh et al. |

FOREIGN PATENT DOCUMENTS

| | | |
|---|---|---|
| EP | 2631968 A2 | 8/2013 |
| EP | 2741348 A1 | 6/2014 |
| JP | 2001256938 A | 9/2001 |
| JP | 20010256937 A | 9/2001 |
| JP | 2006185709 A | 7/2006 |
| JP | 2014533424 A | 12/2014 |
| KR | 101072955 B1 | 10/2011 |
| KR | 20130012354 A | 2/2013 |
| KR | 20130065575 A | 6/2013 |
| KR | 101310482 B1 | 9/2013 |
| KR | 20140066364 A | 6/2014 |

OTHER PUBLICATIONS

Extended Search Report from European Application No. 16717531. 4, dated Jan. 5, 2017.

BATTERY PACK

CROSS-REFERENCE TO RELATED APPLICATION

This application is a national phase entry under 35 U.S.C. § 371 of International Application No. PCT/KR2016/000059, filed Jan. 5, 2016, which claims priority to Korean Patent Application No. 10-2015-0015026, filed Jan. 30, 2015, the disclosures of which are incorporated herein by reference.

TECHNICAL FIELD

The present invention relates to a battery pack, and more particularly, to a battery pack including a switching device for preventing a short circuit from occurring.

BACKGROUND ART

In general, rechargeable batteries may be chargeable and dischargeable batteries, unlike primary batteries that are impossible to charge. Such rechargeable batteries include low-capacity battery packs that are used for portable small electronic devices and high-capacity battery packs that are used for power sources for driving motors of hybrid vehicles.

DISCLOSURE OF THE INVENTION

Technical Problem

The battery pack according to the related art includes a battery module in which a plurality of battery cells are connected in series or parallel and a battery case in which the battery module is built.

However, the battery pack according to the related art may cause a safety issue when the battery pack is pressed by a heavy object, or a strong impact is applied to the battery pack. That is, when a nail passes penetrates the battery pack, or compression force or an impact is applied to the battery pack, a positive electrode and a negative electrode of the battery cell are connected to each other to cause the short circuit. As a result, the battery cell may be ignited or exploded by an exothermic reaction due to the short circuit.

To solve the foregoing limitation, an object of the present invention is to provide a battery pack in which battery cells connected to each other in series or parallel are prevented from being connected to each other when an impact is transmitted to prevent a short circuit from occurring by an exothermic reaction, thereby preventing the battery cell from being ignited or exploded.

Technical Solution

According to an aspect of the present invention, there is provided a battery pack including: a battery module including first and second battery cells that are disposed adjacent to each other, wherein first and second electrode terminals are disposed on each of the first and second electrode terminals; a fuse part including a first fuse connecting the second electrode terminal of the first battery cell to the first electrode terminal of the second battery cell; and a switching device including a first switch disposed outside a top surface of the first battery cell of the battery module and connected to the first fuse and a second switch disposed below the first switch and connected to the second electrode terminal of the second battery cell.

The battery module may further include a third battery cell on which first and second electrode terminals are disposed, the fuse part may further include a second fuse connecting the second electrode terminal of the second battery cell to the first electrode terminal of the third battery cell, and the switching device may further include a third switch disposed below the second switch and connected to the second electrode terminal of the third battery cell.

When the first and second switches contact each other, the first fuse may be melted and disconnected by overcurrent or heat that is generated by connection between the second electrode terminal of the first battery cell and the second electrode terminal of the second battery cell to block the connection between the first battery cell and the second battery cell.

When the second switch and the third switch contact each other, the second fuse may be melted and disconnected by overcurrent or heat that is generated by connection between the second electrode terminal of the second battery cell and the first electrode terminal of the third battery cell to block the connection between the second battery cell and the third battery cell.

Each of the switches may include a metal plate having conductivity.

The switches may be maintained to be spaced apart from each other.

The switches may be disposed above an entire outer circumferential surface of the battery module.

The battery module may further include a fourth battery cell disposed below the third battery cell, and the fuse part may further include a third fuse connecting the third and fourth battery cells to each other in series.

The first electrode terminal may include a positive electrode terminal, and the second electrode terminal may include a negative electrode terminal.

A buffer space may be defined between the switching device and the battery module.

A buffer member may be provided in the buffer space.

Advantageous Effects

The present invention has effects as follows.

First: the switching device may be provided outside the battery pack to previously detect an impact transmitted to the battery pack and prevent the battery cells from being connected to each other, thereby previously preventing the battery cells from being ignited or exploded.

Second: the switching device may be further provided inside the battery pack to detect whether the impact force is transmitted up to the inside of the battery pack, thereby determining whether the inspection of the battery cells is required.

Third: the plurality of switching devices may be constituted by the plurality of switches to adjust the number of battery cells disconnected from each other according to the impact strength.

BRIEF DESCRIPTION OF THE DRAWINGS

FIGS. 2 and 3 are views illustrating an operation state of the battery pack according to the first embodiment, wherein FIG. 2 is a view illustrating a state in which an impact is transmitted to the battery pack, and FIG. 3 is a view illustrating a state in which battery cells of the battery pack are disconnected from each other.

FIGS. 5 to 8 are views illustrating an operation state of the battery pack according to the second embodiment, wherein FIGS. 5 and 6 are views illustrating a state in which two battery cells built in the battery pack are disconnected from each other, and FIGS. 7 and 8 are views illustrating a state in which three battery cells built in the battery pack are disconnected from each other.

MODE FOR CARRYING OUT THE INVENTION

Figure 1:
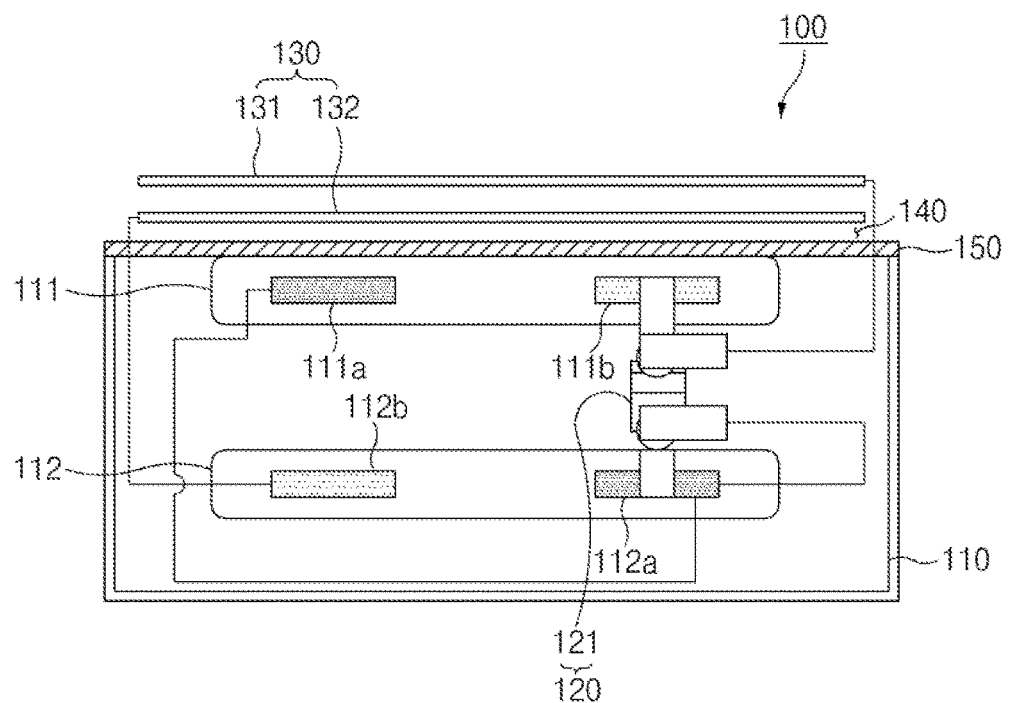
FIG. 1 is a view of a battery pack according to a first embodiment of the present invention.

Hereinafter, preferred embodiments of the present invention will be described in detail with reference to the accompanying drawings in such a manner that the technical idea of the present invention may easily be carried out by a person with ordinary skill in the art to which the invention pertains. The present disclosure may, however, be embodied in different forms and should not be construed as limited to the embodiments set forth herein. In the drawings, anything unnecessary for describing the present disclosure will be omitted for clarity, and also like reference numerals in the drawings denote like elements.

A battery pack according to the present invention includes a switching device for detecting an external impact. The switching device may detect an impact transmitted to the battery pack to block connection between the battery cells provided in the battery pack to prevent the battery cells from being short-circuited by an exothermic reaction, thereby solving the limitation in safety such as ignition and explosion.

Hereinafter, the battery pack according to embodiments of the present invention will be described with reference to the accompanying drawing.

As illustrated in FIG. 1, a battery pack 100 according to a first embodiment of the present invention includes a battery module 110 provided with first and second battery cells 111 and 112, a fuse part 120 connecting the first and second battery cells 111 and 112 to each other in series, and a switching device 130 that melts the fuse part 120 by using high-temperature heat when an impact is applied to the battery module 110 to disconnect the battery cells 111 and 112 from each other.

The battery module 110 includes the first and second battery cells 111 and 112 that are adjacent to each other and on which first and second electrode terminals are disposed. Each of the first and second battery cells 111 and 112 includes an electrode assembly in which a positive electrode, a separator, and a negative electrode are successively stacked and a pouch case in which an electrolyte is accommodated together with the electrode assembly. Also, first and second electrode tabs are provided on the positive and negative electrodes, respectively. Also, the first and second electrode terminals are connected to the first and second tabs, respectively.

That is, first and second electrode terminals 111a and 111b are connected to the first battery cell 111, and first and second electrode terminals 112a and 112b are connected to the second battery cell 112.

Here, a first electrode may be a positive electrode, a second electrode may be a negative electrode, and vice versa.

The fuse part 120 may connect or disconnect the first and second battery cells 111 and 112 to/from each other. The fuse part 120 includes a first fuse 121 connecting the second electrode terminal 111b of the first battery cell 111 to the first electrode terminal 112a of the second battery cell 112.

That is, the fuse part 120 connects the first battery cell 111 to the second battery cell 112 in series by the first fuse 121. When the first fuse 121 is melted by heat and then disconnected, the series connection between the first and second battery cells 111 and 112 may be blocked.

The fuse part 120 may be formed of a metal that is melted when current greater than prospective current flows through a circuit connected thereto.

The switching device 130 disconnects the first fuse 121 when an impact is applied to the battery module 110 to block the connection between the first and second battery cells 111 and 112, thereby preventing a short circuit from occurring. The switching device 130 includes a first switch 131 disposed outside a top surface of the first battery cell 111 of the battery module 110 and connected to the first fuse 121 and a second switch 132 disposed below the first switch 131 and connected to the second electrode terminal 112b of the second battery cell 112.

Here, each of the first and second switches 131 and 132 may be provided as a metal plate having conductivity. That is, each of the first and second switches 131 and 132 may be provided as a metal plate having conductivity such as a copper plate or an aluminum plate to induce an increase in contact force and a stable flow of the current.

The first and second switches 131 and 132 may be maintained to be spaced a predetermined distance from each other. That is, a space of about 2 mm to about 10 mm may be defined between the first and second switches 131 and 132 to prevent the first and second switches 131 and 132 from contacting each other by vibration except for the impact. Here, a support (not shown) supporting the first and second switches 131 and 132 in a state in which the first and second switches 131 and 132 are spaced apart from each other may be disposed on each of both ends of corresponding surfaces corresponding to each other of the first and second switches 131 and 132.

The first and second switches 131 and 132 may be disposed above an entire outer surface of the battery module 110. That is, even though the impact is applied to any position of the outer circumferential surface of the battery module 110, the first fuse 121 may be melted while the first and second switches 131 and 132 contact each other and thus be disconnected to improve safety.

A buffer space 140 for buffering the impact applied to the battery module 110 may be defined between the switching device 130 and the battery module 110 to significantly prevent the impact from being transmitted to the battery module 110.

Particularly, a buffer member 150 may be provided in the buffer space 140. The buffer member 150 may absorb the impact force applied to the battery module 110 by using buffering force thereof to prevent the battery cells within the battery module 110 from being damaged.

Hereinafter, an operation state of the battery pack according to the first embodiment of the present invention will be described.

Figure 2:
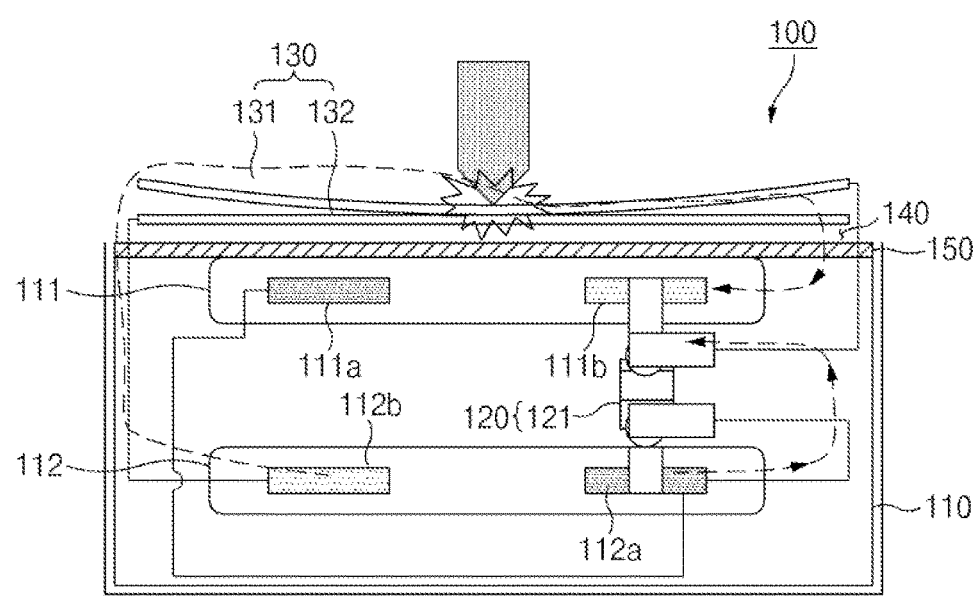

First, as illustrated in FIG. 2, when an impact such as penetration of a nail is applied to the outside of the battery module 110 at which the switching device 130 is disposed, the first switch 131 of the switching device 130 is closely attached to the second switch 132.

Figure 3:
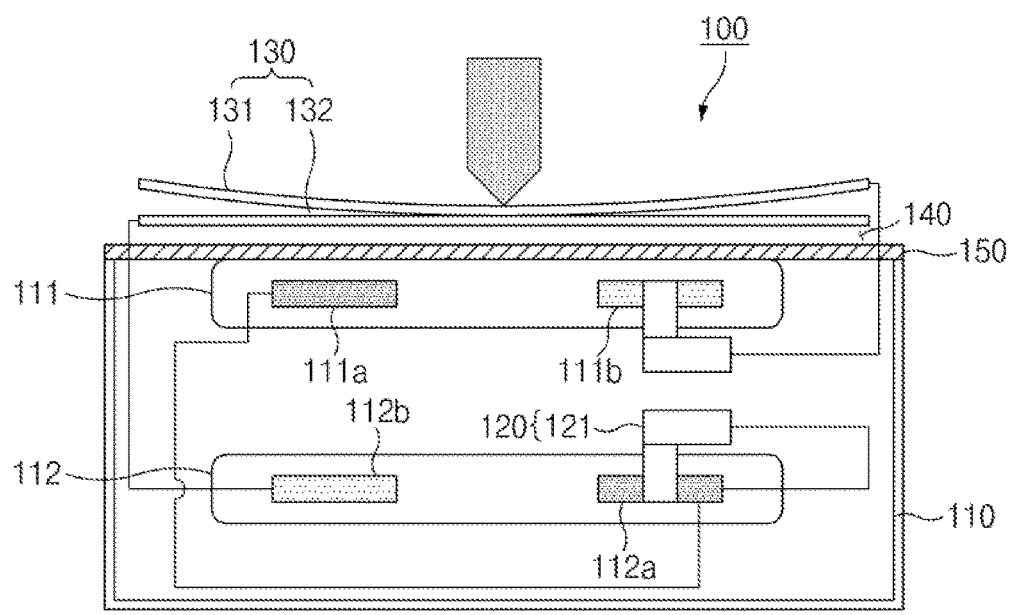

That is, as illustrated in FIG. 3, when the first and second switches 131 and 132 contact each other, the second electrode terminal 111b of the first battery cell 111 and the second electrode terminal 112b of the second battery cell 112 are connected to each other to generate overcurrent or heat. Thus, the first fuse 121 of the fuse part 120 may be melted by the heat and then disconnected to block the connection between the first and second battery cells 111 and 112, thereby previously preventing fire and explosion accidents due to the short circuit from occurring.

Hereinafter, in description of a battery pack according to another embodiment of the present invention, constituents having the same configuration and function have been given with the same reference numeral in the drawings, and thus their duplicated descriptions will be omitted.

Figure 4:
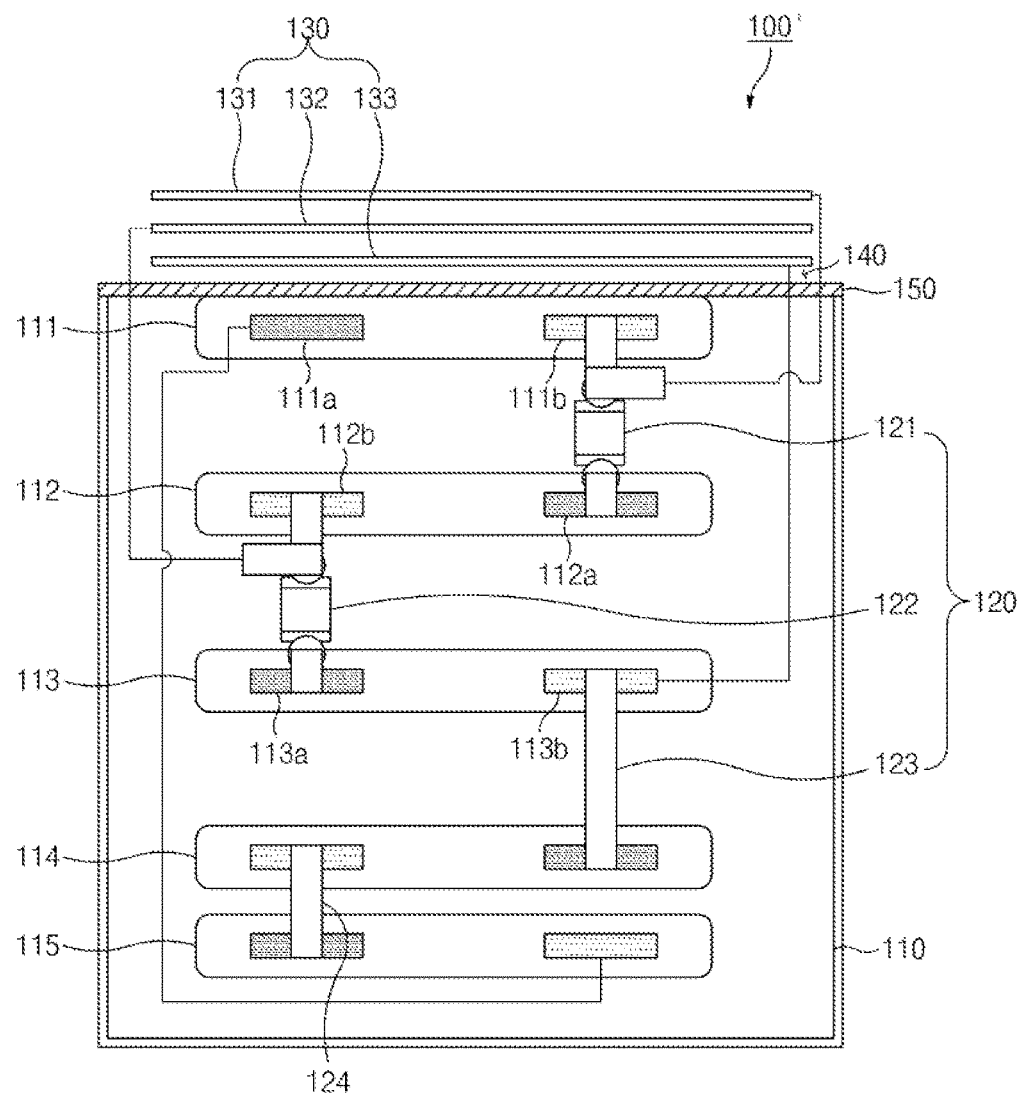
FIG. 4 is a view of a battery pack according to a second embodiment of the present invention.

As illustrated in FIG. 4, a battery pack 100' according to a second embodiment of the present invention includes a battery module 110 provided with first, second and third battery cells 111, 112, and 113, which are disposed adjacent to each other, a fuse part 120 connecting the first, second, and third battery cells 111, 112, and 113 to each other in series or parallel, and a switching device 130 that melts the fuse part 120 by using high-temperature heat when an impact is applied to the battery module 110 to disconnect the first, second, and third battery cells 111, 112, and 113 from each other.

The battery module 110 includes the first, second, and third battery cells 111, 112, and 113 that are adjacent to each other and on which first and second electrode terminals are disposed. Each of the first, second, and third battery cells 111, 112, 113 includes an electrode assembly in which a positive electrode, a separator, and a negative electrode are successively stacked and a pouch case in which an electrolyte is accommodated together with the electrode assembly. Also, the first and second electrode terminals are connected to first and second electrode tabs of the electrode assembly, respectively.

The fuse part 120 includes a first fuse 121 connecting a second electrode terminal 111b of the first battery cell 111 to a first electrode terminal 112a of the second battery cell 112 and a second fuse 122 connecting a second electrode terminal 112b of the second battery cell 112 to a first electrode terminal 113a of the third battery cell 113.

That is, the fuse part 120 may block the connection between the first and second battery cells 111 and 112 when the first fuse 121 is melted and disconnected and the connection between the second and third battery cells 112 and 113 when the second fuse 122 is melted and disconnected.

The switching device 130 includes a first switch disposed outside a top surface of the first battery cell 111 of the battery module 110 and connected to the first fuse 121, a second switch 132 disposed below the first switch 131 and connected to the second electrode terminal 112b of the second battery cell 112, and a third switch 133 disposed below the second switch 132 and connected to the second electrode terminal 113b of the third battery cell 113.

Here, the first, second, and third switches 131, 132, and 133 may have the same size and thickness.

The battery cell 110 may further include a fourth battery cell 114 and an n-th battery cell 115, which are disposed below the third battery cell 113. The fuse part 120 may further include a third fuse 123 connecting the third battery cell 113 and the fourth battery cell 114 to each other in series and an n-th fuse 124 connecting the fourth battery cell 114 and the n-th battery cell 115 to each other in series.

That is, in the battery pack 100' according to the second embodiment of the present invention, a voltage may increase by the fourth battery cell 114 and the n-th battery cell 115. In addition, when the first, second, and third switches 131, 132, and 133 contact each other, the first to third fuses 121, 122, and 123 may be disconnected from each other to block the connection between the first to fourth battery cells 111, 112, 113, and 114, thereby preventing fire and explosion accidents due to a short circuit of the battery cells from occurring.

Hereinafter, an operation state of the battery pack 100' according to the second embodiment of the present invention will be described.

Figure 5:
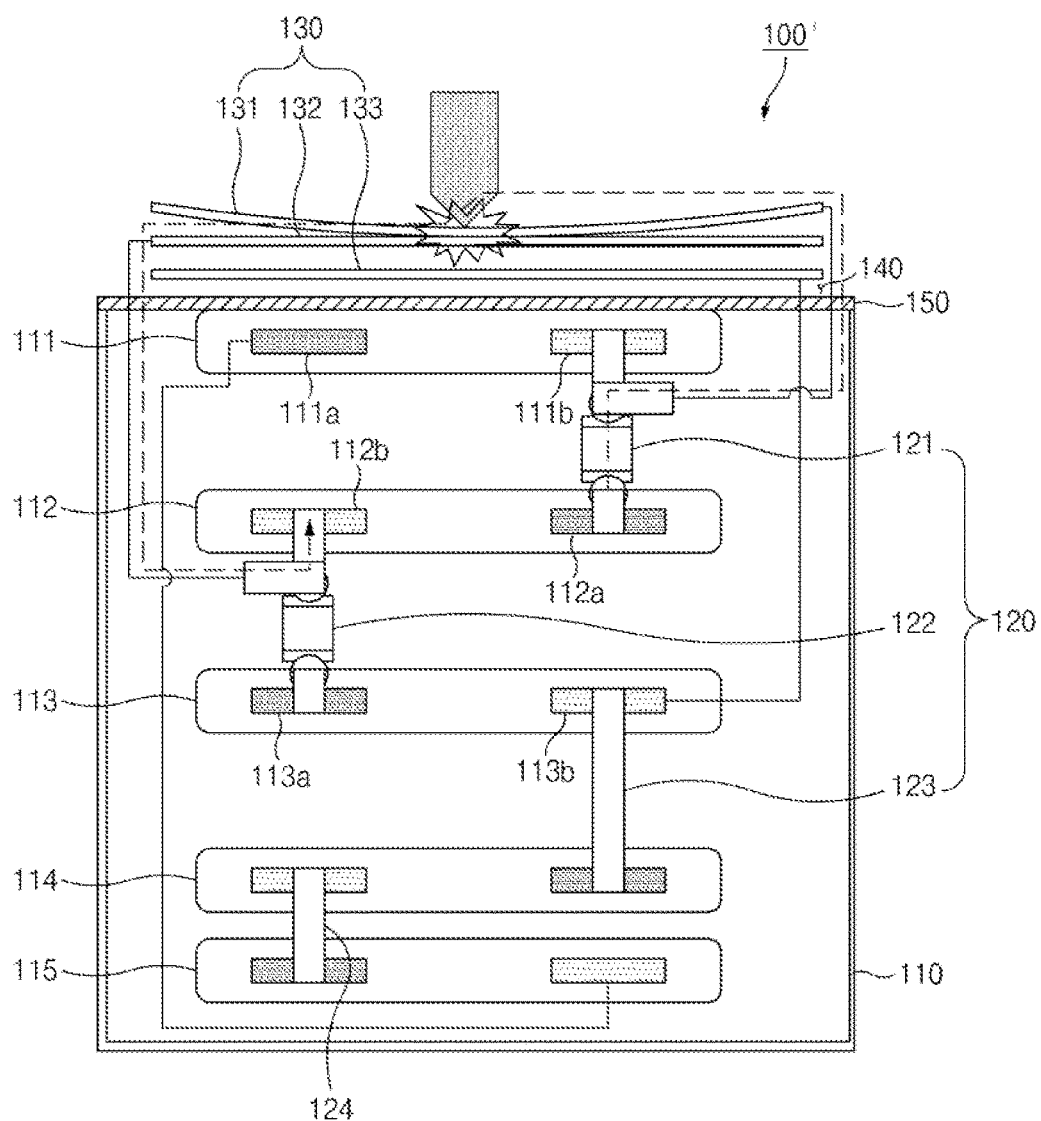

First, as illustrated in FIG. 5, when an impact such as penetration of a nail is applied to the outside of the battery module 111 at which the switching device 130 is disposed, the first switch 131 of the switching device 130 is closely attached to the second switch 132.

Figure 6:
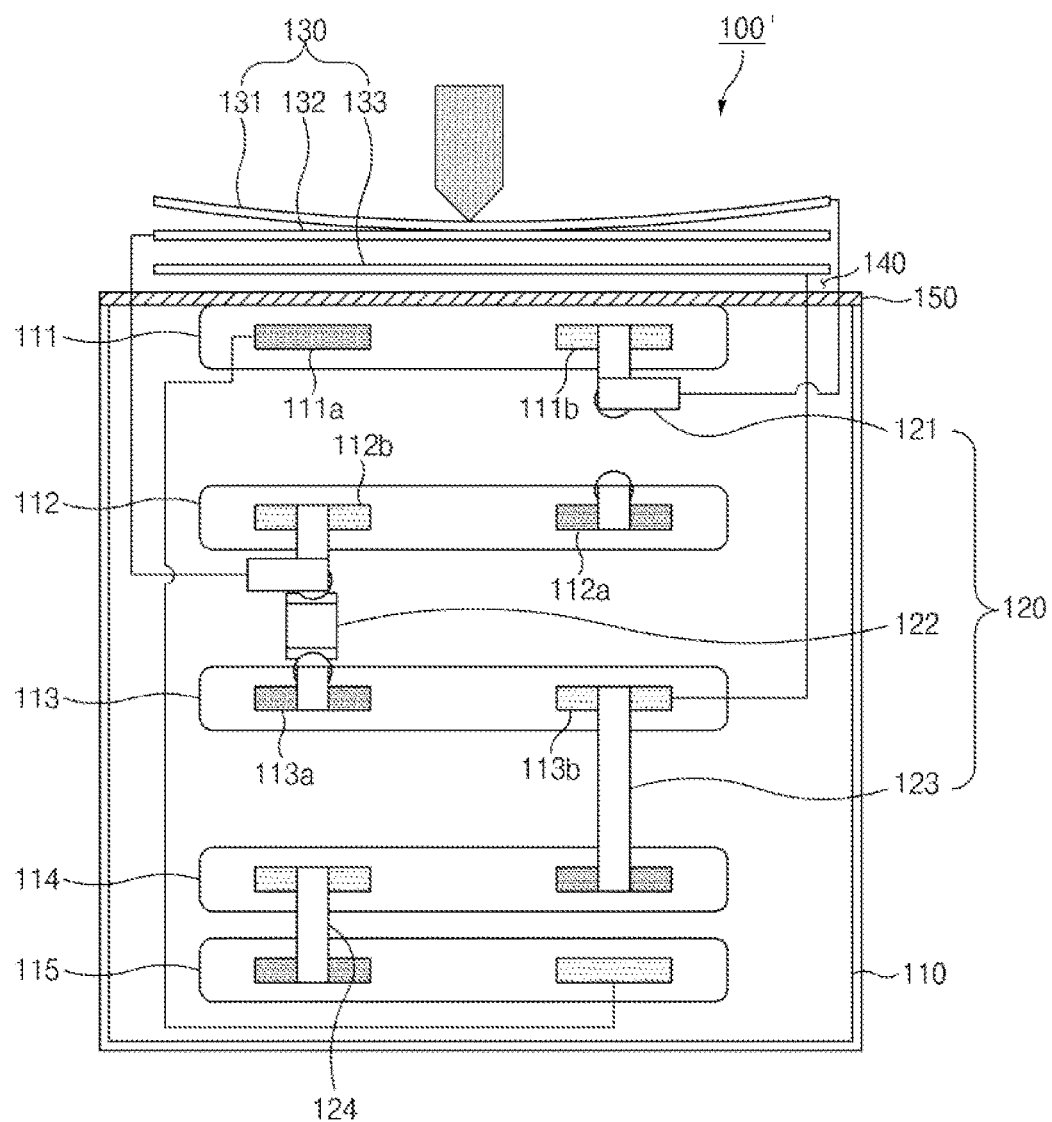

That is, as illustrated in FIG. 6, when the first and second switches 131 and 132 contact each other, the second electrode terminal 111b of the first battery cell 111 and the second electrode terminal 112b of the second battery cell 112 are connected to each other to generate overcurrent or heat. Thus, the first fuse 121 of the fuse part 120 may be melted by the heat and then disconnected to block the connection between the first and second battery cells 111 and 112, thereby previously preventing fire and explosion accidents due to the short circuit from occurring.

Figure 7:
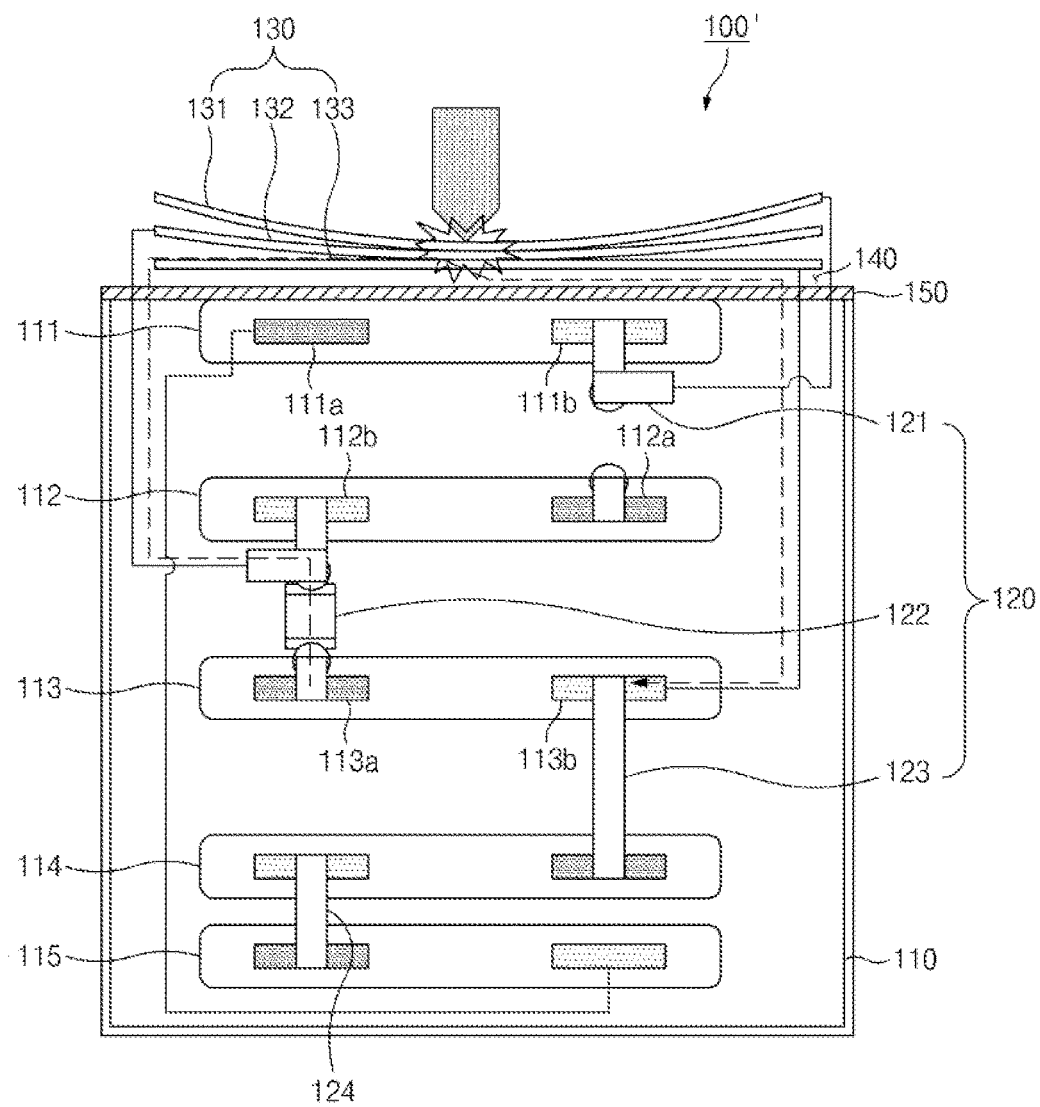

Here, as illustrated in FIG. 7, if a large impact is applied to the outside of the battery module 111 at which the switching device 130 is disposed, the first and second switches 131 and 132 of the switching device 130 are closely attached to the third switch 133.

Figure 8:
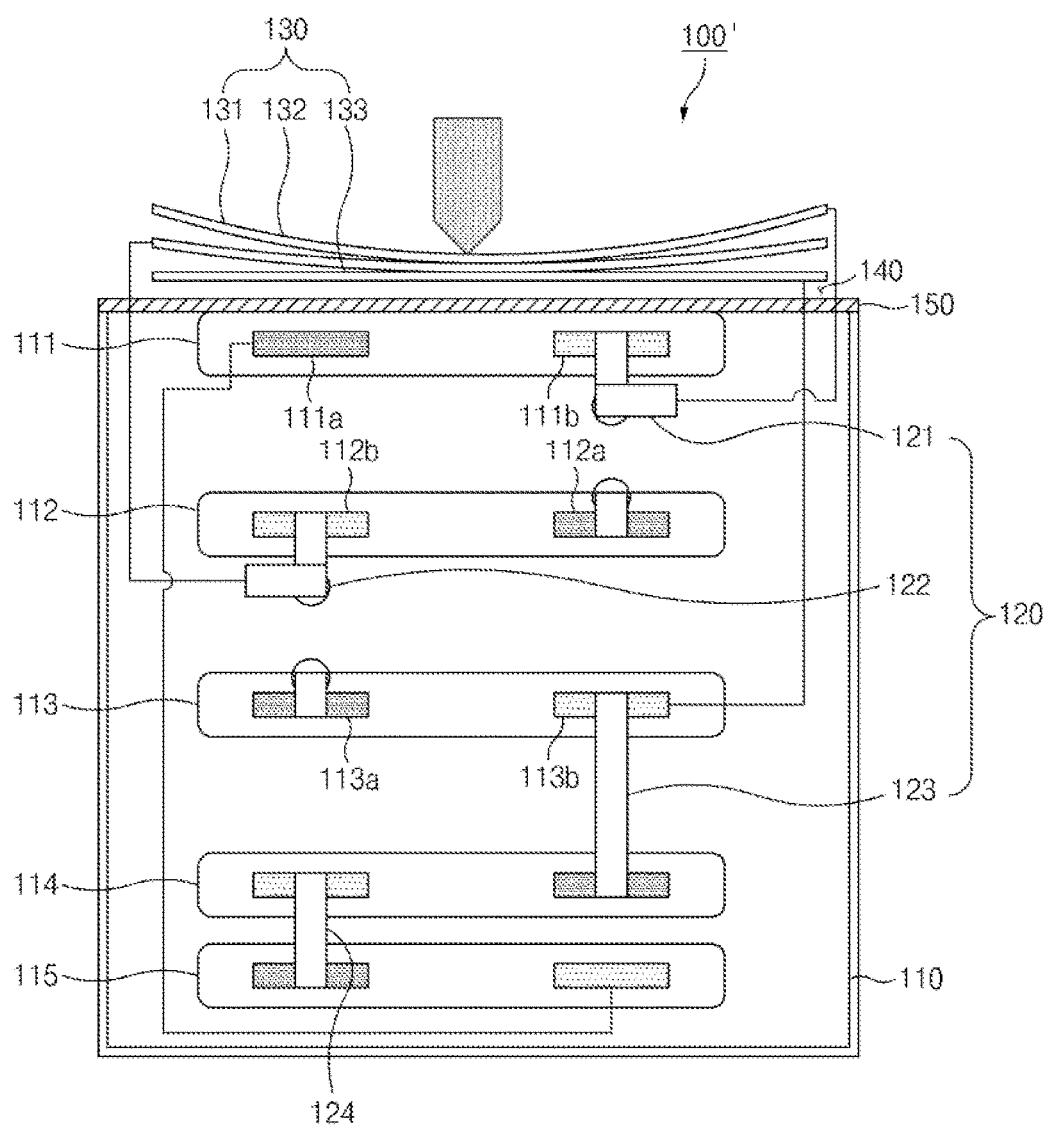

That is, as illustrated in FIG. 8, the first and second switches 131 and 132 may contact each other to melt and disconnect the first fuse 121, thereby to block the connection between the first and second battery cells 111 and 112. Continuously, the second and third switches 132 and 133 may contact each other to connect the second electrode terminal 112b of the second battery cell 112 to the first terminal 113a of the third battery cell 113, thereby to generate overcurrent or heat. Thus, the second fuse 132 may be melted by the heat and disconnected to block the connection between the second battery cell 112 and the third battery cell 113.

Therefore, in the battery pack 100' according to the second embodiment of the present invention, the connection between the first, second, and third battery cells may be blocked through the first and second fuses to previously prevent the fire and explosion accidents due to the short circuit from occurring.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A battery pack comprising:
a battery module comprising first and second battery cells that are disposed adjacent to each other, wherein first and second electrode terminals are disposed on each of the first and second battery cells, and a third battery cell on which first and second electrode terminals are disposed;
a fuse part comprising a first fuse connecting the second electrode terminal of the first battery cell to the first electrode terminal of the second battery cell, and a second fuse connecting the second electrode terminal of the second battery cell to the first electrode terminal of the third battery cell; and a switching device comprising a first switch disposed outside a top surface of the first battery cell of the battery module and connected to the first fuse and a second switch disposed below the first switch and connected to the second electrode terminal of the second battery cell, and a third switch disposed below the second switch and connected to the second electrode terminal of the third battery cell, wherein at least one switch of the first switch and the second switch is movable between:
- a first position in which the first switch and the second switch are physically spaced apart from one another and the first switch and the second switch are not directly electrically connected with one another; and
- a second position in which the first switch and the second switch are in physical contact with one another and the first switch and the second switch are directly electrically connected with one another, wherein, when the first switch and the second switch contact each other, the first fuse is melted and disconnected by overcurrent or heat that is generated by connection between the second electrode terminal of the first battery cell and the second electrode terminal of the second battery cell to block the connection between the first battery cell and the second battery cell, and wherein, when the second switch and the third switch contact each other, the second fuse is melted and disconnected by overcurrent or heat that is generated by connection between the second electrode terminal of the second battery cell and the first electrode terminal of the third battery cell to block the connection between the second battery cell and the third battery cell.

2. The battery pack of claim 1, wherein each of the first switch, the second switch, and the third switch comprises a metal plate having conductivity.

3. The battery pack of claim 1, wherein the first switch, the second switch, and the third switch are disposed above an entire outer circumferential surface of the battery module.

4. The battery pack of claim 1, wherein the battery module further comprises a fourth battery cell disposed below the third battery cell, and
the fuse part further comprises a third fuse connecting the third and fourth battery cells to each other in series.

5. The battery pack of claim 1, wherein the first electrode terminal comprises a positive electrode terminal, and the second electrode terminal comprises a negative electrode terminal.

6. The battery pack of claim 1, wherein a buffer space is defined between the switching device and the battery module.

7. The battery pack of claim 6, wherein a buffer member is provided in the buffer space.

* * * * *